US010585257B1

(12) United States Patent
Smith (10) Patent No.: US 10,585,257 B1
(45) Date of Patent: Mar. 10, 2020

(54) PRINTABLE COLOR-CODED PATTERN LABEL ARRAY FOR PATCH FIELD APPLICATIONS (71) Applicant: Ortronics, Inc., New London, CT (US)

(72) Inventor: Daniel M. Smith, Westerly, RI (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 16/244,856

(22) Filed: Jan. 10, 2019

(51) Int. Cl.
G02B 6/44 (2006.01)
H01R 13/74 (2006.01)
G02B 6/38 (2006.01)

(52) U.S. Cl.
CPC ......... *G02B 6/4453* (2013.01); *G02B 6/3897* (2013.01); *G02B 6/4452* (2013.01); *H01R 13/74* (2013.01)

(58) Field of Classification Search
CPC ..... G09F 2003/0276; G09F 2003/0202; G09F 2003/0208; G09F 2003/023; G09F 2003/0264
See application file for complete search history.

(56) References Cited

U.S. PATENT DOCUMENTS 3,937,493 A * 2/1976 Fasbender ............... B42F 17/00
283/41
5,127,082 A * 6/1992 Below ................. G02B 6/4454
206/557
2006/0093303 A1 * 5/2006 Reagan ................. G02B 6/4466
385/135
2010/0202740 A1 * 8/2010 Barlowe .............. G02B 6/4471
385/100
2011/0085774 A1 * 4/2011 Murphy ............... G02B 6/3825
385/134
2011/0280537 A1 * 11/2011 Cowen ................. G02B 6/4471
385/135
2011/0283578 A1 * 11/2011 Engelby ................ G09F 3/0288
40/584
2012/0171888 A1 * 7/2012 Dietz ................. H01R 13/6395
439/345
2014/0105539 A1 * 4/2014 Conner ................ G02B 6/4471
385/24

(Continued)

Primary Examiner — Gary C Hoge
(74) Attorney, Agent, or Firm — McCarter & English, LLP (57) ABSTRACT The present disclosure provides improved color-coded labels, and improved systems and methods for utilizing such color-coded labels. More particularly, the present disclosure provides advantageous systems/methods for utilizing printable color-coded pattern label arrays for patch field applications and the like. The present disclosure provides improved methods for labeling data center applications (e.g., patch field applications). In exemplary embodiments, by fabricating a pre-printed, repeating pattern of the colors defined by industry specification TIA-598 to a roll/sheet of printable labels, this color coding can be advantageously applied to an array of patch field labels. Once the individual labels are printed and applied, the individual label color will translate to a sub-unit fiber number, while the overall array of label colors will reveal the panel polarity, which is important service information, which will be delivered in an immediate visual color-coded manner to the servicing technicians without the need for additional text.

18 Claims, 4 Drawing Sheets (56) References Cited

U.S. PATENT DOCUMENTS

| | | | | |
|---|---|---|---|---|
| 2014/0133808 A1* | 5/2014 | Hill | .................. | G02B 6/3826 |
| | | | | 385/81 |
| 2014/0219615 A1* | 8/2014 | Petersen | .............. | G02B 6/3817 |
| | | | | 385/88 |
| 2014/0270636 A1* | 9/2014 | Manes | ................. | G02B 6/4472 |
| | | | | 385/24 |
| 2017/0066275 A1* | 3/2017 | Kovacevitch | ........ | B42D 15/025 |

* cited by examiner

PRINTABLE COLOR-CODED PATTERN LABEL ARRAY FOR PATCH FIELD APPLICATIONS

FIELD OF THE DISCLOSURE

The present disclosure relates to color-coded labels and related systems and methods of use and, more particularly, to printable color-coded pattern label arrays for patch field applications and related systems/methods of use.

BACKGROUND OF THE DISCLOSURE

In general, devices for interfacing with high frequency data transfer media are known. See, e.g., U.S. Pat. Nos. 8,672,709; 8,731,364; 9,606,317 and 9,784,936; and U.S. Patent Pub. Nos. 2015/0362092 and 2015/0364876, the entire contents of each being hereby incorporated by reference in their entireties.

In general, many data transfer media includes multiple pairs of lines bundled together. Communications systems typically incorporate such media (e.g., fiber optic cables, etc.) and connectors (e.g., jack/plug combinations) for data transfer. For example, a plurality of jack housings may be positioned adjacent one another in a multi-gang jack panel or the like, with each jack housing releasably secured and/or attached to the jack panel or the like.

In general, commercial buildings require an effective and efficient telecommunications infrastructure to support the wide variety of services that rely on the transport of information. Typically, wiring systems within buildings are terminated at a location where they may be interconnected with one another, and/or to other cabling systems or telecommunications equipment. Cables are often terminated on wire panels or patch panels or the like, which can be mounted to racks or to some other location/structure.

Patch panels are known in the field of data communication systems. See, e.g., U.S. Pat. No. 8,106,311, the entire contents of which is hereby incorporated by reference in its entirety.

Some other exemplary assemblies/systems in this general field are described and disclosed in U.S. Pat. Nos. 7,697,811; 7,983,038 and 8,398,039, the entire contents of each being hereby incorporated by reference in their entireties.

A patch panel generally provides a plurality of network ports incorporated into a structural element that connect incoming and outgoing lines of a communication/electrical system (e.g., a local area network (LAN) or the like). Typical patch panels are mounted hardware units that include a plurality of port locations, and utilize cables for interconnections. A patch panel can use patch cords to create the interconnections. Patch panel systems are generally intended to facilitate organization and management in implementing telecommunications wiring systems (e.g., for high speed data networks).

In general, many rows of cabinets or racks typically fill a data center or telecommunications room. Patch panels affixed to a rack and/or a telecommunications room provide convenient access to telecommunication devices (e.g., servers) within the rack or room. As the demand for the use of telecommunication devices rapidly grows, space for such devices becomes limited and/or expensive.

A constant need exists among manufacturers to develop patch panel assemblies/patching systems or the like that include improved features and structures.

As patch field fiber density has increased, the amount of physical space remaining for labels has generally decreased. This has had some serious implications, including but not limited to: (i) labels are generally small (e.g., around ¼" tall) and getting smaller; (ii) text space on a label is often limited to a single line; (iii) text size on a label is often small and difficult to read; and (iv) character limits on a label force label assignments to encode or even omit key port information.

Thus, an interest exists for improved labels for data center applications, and related systems and methods of use.

These and other inefficiencies and opportunities for improvement are addressed and/or overcome by the systems, methods and assemblies of the present disclosure.

SUMMARY OF THE DISCLOSURE

The present disclosure provides advantageous color-coded labels, and improved systems and methods for utilizing such color-coded labels. More particularly, the present disclosure provides improved systems and methods for utilizing printable color-coded pattern label arrays for patch field applications and the like.

In general, the present disclosure provides improved methods for labeling data center applications (e.g., patch field applications). In exemplary embodiments, by fabricating a pre-printed, repeating pattern of the colors defined by the Telecommunications Industry Association's TIA-598 to a roll/sheet of printable labels, this color coding can be advantageously applied to an array of patch field labels. Once the labels are printed and applied, the individual label color will translate to a sub-unit fiber number, while the overall array of label colors will reveal the panel polarity, which is important service information, which will be delivered in an immediate visual color-coded manner to the servicing technicians without the need for additional text.

The present disclosure provides for a method for labeling data center applications including providing a first plurality of label members, each label member of the first plurality of label members having a color area that includes a unique color coding in the color area that is different than each color coding in the other respective color areas of the other respective label members of the first plurality of label members; positioning each label member of the first plurality of label members proximal to an individual and distinct optical fiber port of a media patching system; wherein each unique color coding of each label member of the first plurality of label members specifies a unique and distinct fiber unit to be mounted with respect to the optical fiber port respectively positioned proximal to each label member of the first plurality of label members.

The present disclosure also provides for a method for labeling data center applications further including providing a second plurality of label members, each label member of the second plurality of label members having a color area that includes a unique color coding in the color area that is different than each color coding in the other respective color areas of the other respective label members of the second plurality of label members; positioning each label member of the second plurality of label members proximal to an individual and distinct optical fiber port of the media patching system; wherein each unique color coding of each label member of the second plurality of label members specifies a unique and distinct fiber unit to be mounted with respect to the optical fiber port respectively positioned proximal to each label member of the second plurality of label members.

The present disclosure also provides for a method for labeling data center applications wherein each label member of the first plurality of label members includes a text area, each text area configured to include text symbols.

The present disclosure also provides for a method for labeling data center applications wherein the first plurality of label members includes a first label member, a second label member, a third label member, a fourth label member, a fifth label member and a sixth label member; and wherein the color area of the first label member includes the color blue, the color area of the second label member includes the color orange, the color area of the third label member includes the color green, the color area of the fourth label member includes the color brown, the color area of the fifth label member includes the color slate, and the color area of the sixth label member includes the color white.

The present disclosure also provides for a method for labeling data center applications wherein the first plurality of label members includes a seventh label member, an eighth label member, a ninth label member, a tenth label member, an eleventh label member and a twelfth label member; and wherein the color area of the seventh label member includes the color red, the color area of the eighth label member includes the color black, the color area of the ninth label member includes the color yellow, the color area of the tenth label member includes the color violet, the color area of the eleventh label member includes the color rose, and the color area of the twelfth label member includes the color aqua.

The present disclosure also provides for a method for labeling data center applications wherein each unique color coding of each label member of the first plurality of label members includes a color from the TIA-598 specification.

The present disclosure also provides for a method for labeling data center applications wherein the media patching system includes a panel member; and wherein each label member of the first plurality of label members is positioned on a front surface of the panel member. The present disclosure also provides for a method for labeling data center applications wherein the media patching system includes a cassette assembly; and wherein each label member of the first plurality of label members is positioned on a front surface of the cassette assembly.

The present disclosure also provides for a method for labeling data center applications wherein the media patching system includes a panel member, the panel member including a plurality of apertures; and wherein the panel member is a patch panel member.

The present disclosure also provides for a method for labeling data center applications wherein each individual and distinct optical fiber port of the media patching system is configured for mating with fiber optic connectors.

The present disclosure also provides for a method for labeling data center applications wherein the media patching system is configured to be mounted with respect to a supporting structure. The present disclosure also provides for a method for labeling data center applications wherein the supporting structure is a network or server rack.

The present disclosure also provides for a method for labeling data center applications wherein the first plurality of label members are provided on a sheet or roll. The present disclosure also provides for a method for labeling data center applications wherein each label member of the first plurality of label members includes an adhesive backing.

The present disclosure also provides for a method for labeling data center applications including providing a first plurality of label members, each label member of the first plurality of label members having a color area that includes a unique color coding in the color area that is different than each color coding in the other respective color areas of the other respective label members of the first plurality of label members; positioning each label member of the first plurality of label members proximal to an individual and distinct optical fiber port of a media patching system; wherein each label member of the first plurality of label members includes a text area, each text area configured to include text symbols; wherein each individual and distinct optical fiber port of the media patching system is configured for mating with fiber optic connectors; wherein the media patching system is configured to be mounted with respect to a supporting structure; wherein each unique color coding of each label member of the first plurality of label members specifies a unique and distinct fiber unit to be mounted with respect to the optical fiber port respectively positioned proximal to each label member of the first plurality of label members; wherein the first plurality of label members includes a first label member, a second label member, a third label member, a fourth label member, a fifth label member and a sixth label member; and wherein the color area of the first label member includes the color blue, the color area of the second label member includes the color orange, the color area of the third label member includes the color green, the color area of the fourth label member includes the color brown, the color area of the fifth label member includes the color slate, and the color area of the sixth label member includes the color white.

The present disclosure also provides for a method for labeling data center applications further including providing a second plurality of label members, each label member of the second plurality of label members having a color area that includes a unique color coding in the color area that is different than each color coding in the other respective color areas of the other respective label members of the second plurality of label members; positioning each label member of the second plurality of label members proximal to an individual and distinct optical fiber port of the media patching system; wherein each label member of the second plurality of label members includes a text area, each text area configured to include text symbols; wherein each unique color coding of each label member of the second plurality of label members specifies a unique and distinct fiber unit to be mounted with respect to the optical fiber port respectively positioned proximal to each label member of the second plurality of label members.

The present disclosure also provides for a method for labeling data center applications wherein the first plurality of label members includes a seventh label member, an eighth label member, a ninth label member, a tenth label member, an eleventh label member and a twelfth label member; and wherein the color area of the seventh label member includes the color red, the color area of the eighth label member includes the color black, the color area of the ninth label member includes the color yellow, the color area of the tenth label member includes the color violet, the color area of the eleventh label member includes the color rose, and the color area of the twelfth label member includes the color aqua.

The present disclosure also provides for a method for labeling data center applications wherein the media patching system includes a panel member, the panel member including a plurality of apertures; and wherein the panel member is a patch panel member.

The present disclosure also provides for a label for a data center application including a label member that extends from a first side to a second side and from a first end to a second end, the label member including a color area; wherein the color area extends from the first side to the second side, and is positioned proximal to the second end;

wherein the color area includes a color from the TIA-598 specification that specifies a unique and distinct fiber unit positioned proximal to the label member.

The present disclosure also provides for a label for a data center application wherein the label member includes a text area, the text area extending from the first side to the second side, and extending from the color area to the first end.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the scope of the present disclosure. To assist those of ordinary skill in the art in making and using the disclosed systems, methods and assemblies, reference is made to the appended figures, wherein.

DETAILED DESCRIPTION OF DISCLOSURE

The exemplary embodiments disclosed herein are illustrative of advantageous color-coded labels, and systems of the present disclosure and utilization methods/techniques thereof. It should be understood, however, that the disclosed embodiments are merely exemplary of the present disclosure, which may be embodied in various forms. Therefore, details disclosed herein with reference to exemplary color-coded labels/utilization methods and associated processes/techniques of assembly and use are not to be interpreted as limiting, but merely as the basis for teaching one skilled in the art how to make and use the advantageous color-coded labels/systems and/or alternative color-coded labels/systems of the present disclosure.

The present disclosure provides improved color-coded labels, and improved systems and methods for utilizing such color-coded labels. More particularly, the present disclosure provides advantageous systems and methods for utilizing printable color-coded pattern label arrays for patch field applications and the like. The present disclosure provides improved methods for labeling data center applications (e.g., patch field applications).

Current practice provides that labels in data center applications are usually generated on a spreadsheet by means of a text algorithm, which encodes the required data into a short text string for each cell of the spreadsheet, which in turn corresponds to a single label to be applied. These are printed in batches, often consisting of thousands of labels, given by the sheet/roll to technicians to apply to the appropriate physical location.

In exemplary embodiments, the present disclosure provides for systems/methods for the design and use of improved color-coded pattern label arrays for labeling data center applications, thereby providing a significant operational, commercial and/or manufacturing advantage as a result.

In cabling applications (e.g., optical fiber cables), it is noted that information can be captured in the form of color codes. In particular, cable fiber sub-units are encoded by means of the colors defined by industry specification TIA-598, which defines the traditional 12-fiber (and now also the newer 16-fiber) color sequence where fibers one to twelve are symbolized by the colors blue, orange, green, brown, slate (gray), white, red, black, yellow, violet, rose (pink), and aqua, respectively.

In exemplary embodiments, by fabricating a pre-printed, repeating pattern of these colors to a roll or sheet of printable labels, this color coding can be advantageously applied to an array of patch field labels.

Each individual label in the array will feature one or more color stripes at the margin so as not to reduce the printable label space. Each successive label will have a different stripe color, which will cycle through the above-noted colors and then repeat in the same sequence.

Once the individual labels are printed and applied, the individual label color will translate to a sub-unit fiber number, while the overall array of label colors will reveal the panel polarity, which is important service information, which will be delivered in an immediate visual color-coded manner to the servicing technicians without the need for additional text.

By utilizing color-coding with this system/method, this highly advantageous deployment scheme or labeling method has several advantages, including but not limited to: (i) one row of labels corresponds to one trunk cable sub-unit, and thus one (or half of one in higher density applications) cassette/adapter panel, allowing for easy indexing of label deployment; (ii) each cassette/adapter panel will have its label color field pattern match, greatly reducing the risk of labeling errors and omissions; (iii) text characters corresponding to port numbers can be omitted and instead coded by label color, allowing more text space for more detailed port descriptions; and (iv) through differing color sequences, differing panel polarity schemes can be codified without additional text.

Because the technicians involved in this process are already used to dealing with TIA-598 color coding sequences in other applications, such as cable fiber sub-units and breakout kits, the meaning of these colors will be extremely intuitive for them.

Label colors will also be more visible and easily discernable than the port numbering on a panel silkscreen. For that reason, these color-coded labels will provide additional advantages during later servicing of the patch field. For example, technicians will associate port numbers with specific label colors (e.g., blue=port #1, yellow=port #9, etc.), greatly increasing the speed with which correct individual ports are identified, and reducing both service time and service errors. Additionally, panel polarity will be immediately evident by the color pattern of the associated label field, again reducing service errors by preventing the application of incompatible cabling.

In general, this label array system/method of the present disclosure provides clear advantages over existing label options, at a very modest additional material cost. Further, this cost will be more than offset immediately by labor efficiencies gained during deployment.

Referring now to the drawings, like parts are marked throughout the specification and drawings with the same reference numerals, respectively. Drawing figures are not necessarily to scale and in certain views, parts may have been exaggerated for purposes of clarity.

Figure 1:
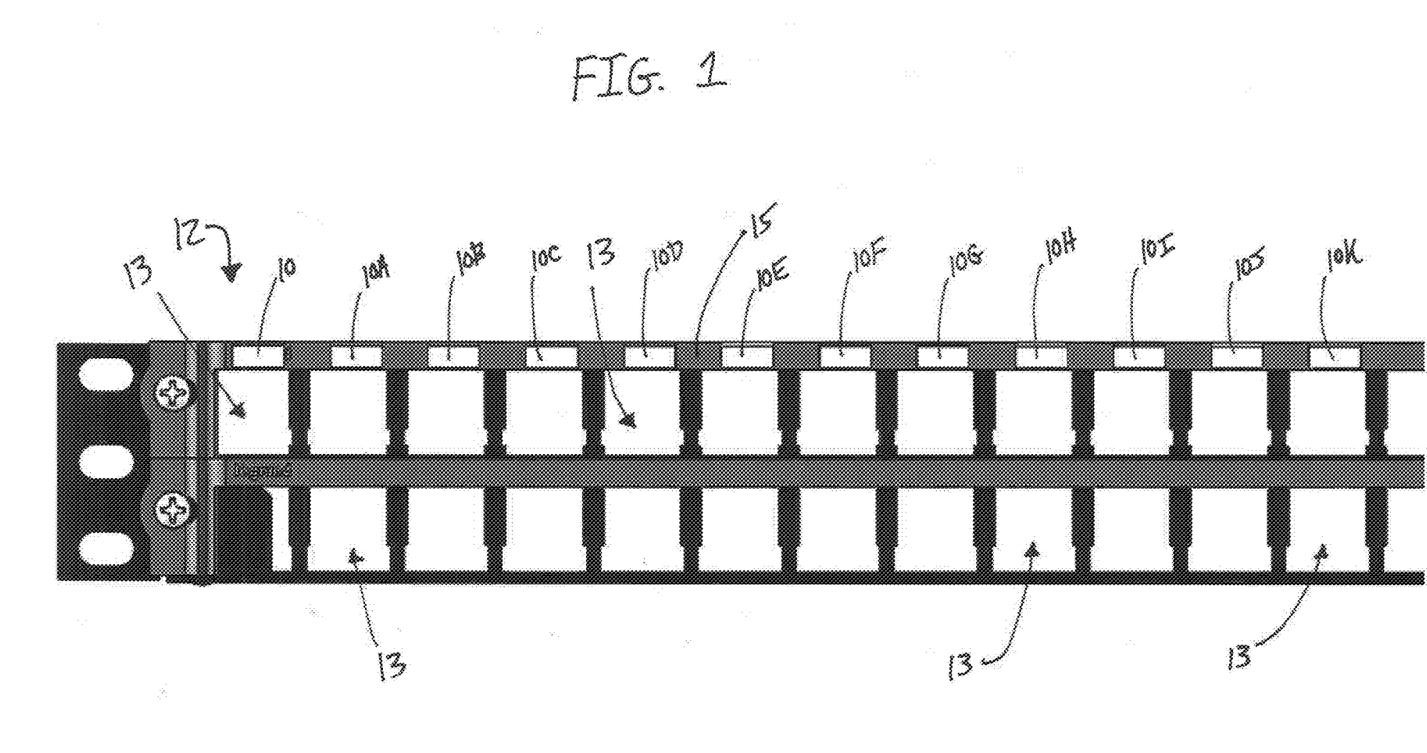
FIG. 1 is a partial front view of an exemplary panel member for a media patching system according to the present disclosure.

With reference to FIG. 1, there is illustrated an exemplary panel member 12 for use in a data center application, patch field application and/or media patching system or the like.

In general, the media patching system that utilizes panel member 12 is configured and dimensioned to be used as a patching system for media connections (e.g., as described and disclosed in U.S. Pat. No. 9,606,317). More particularly, the media patching system that utilizes panel member 12 can be configured to support high density media connections. It is noted that the media patching system that utilizes panel member 12 can take a variety of forms, shapes and/or designs.

As described and disclosed in U.S. Pat. No. 9,606,317, the media patching system that utilizes panel member 12 can be configured to be mounted with respect to a supporting structure (e.g., network or server rack) or the like. However, it is also noted that the media patching system that utilizes panel member 12 can be adapted for use in conjunction with other structures, such as, for example, frames, cabinets, supporting structures, or other structures that stand to benefit from proximate cable management functionality. For ease of disclosure, the potential structures to which the disclosed media patching systems may be mounted are collectively referred to as "racks." However, it is to be understood that the present disclosure is not limited by or to implementations wherein the disclosed media patching systems are mounted with respect to, or used in conjunction with, a rack, but may be mounted with respect to, or used in conjunction with other structures/units (e.g., structures/units associated with cable routing).

As noted, panel member 12 can be utilized with a media patching system to support multiple media connections. As shown in FIG. 1, exemplary panel member 12 has a front panel surface/segment 15 that includes a plurality of apertures 13 therethrough.

As described and disclosed in U.S. Pat. Nos. 9,606,317 and 8,672,709 noted above, each aperture 13 is typically configured and dimensioned to have at least one connector assembly (e.g., fiber-optic connector assembly) or connective device mounted with respect thereto.

As such, a plurality of connector assemblies (e.g., fiber-optic connector assemblies) can be mounted with respect to panel member 12. It is noted that panel member 12 can include any number of connector assemblies mounted thereon (e.g., one, two, three, four, a plurality, etc.).

For example, each fiber-optic connector assembly mounted to panel member 12 can include one or more ports to facilitate communication with a mating assembly (e.g., fiber optic connector), that in turn can interact with various fiber optic media (fiber optic cables, etc.).

Figure 3:
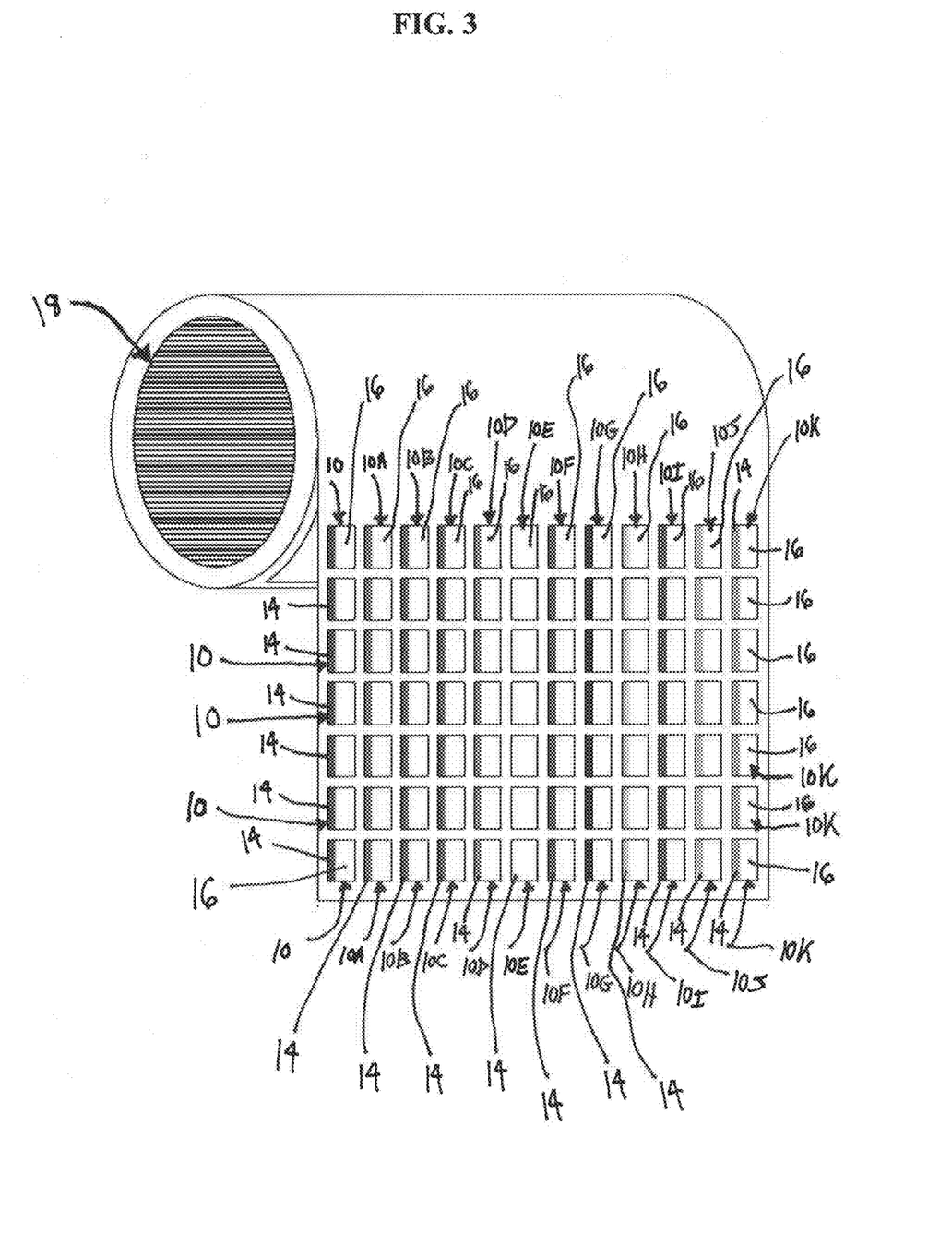
FIG. 3 is a front perspective view of exemplary label members according to the present disclosure.
Figure 4:
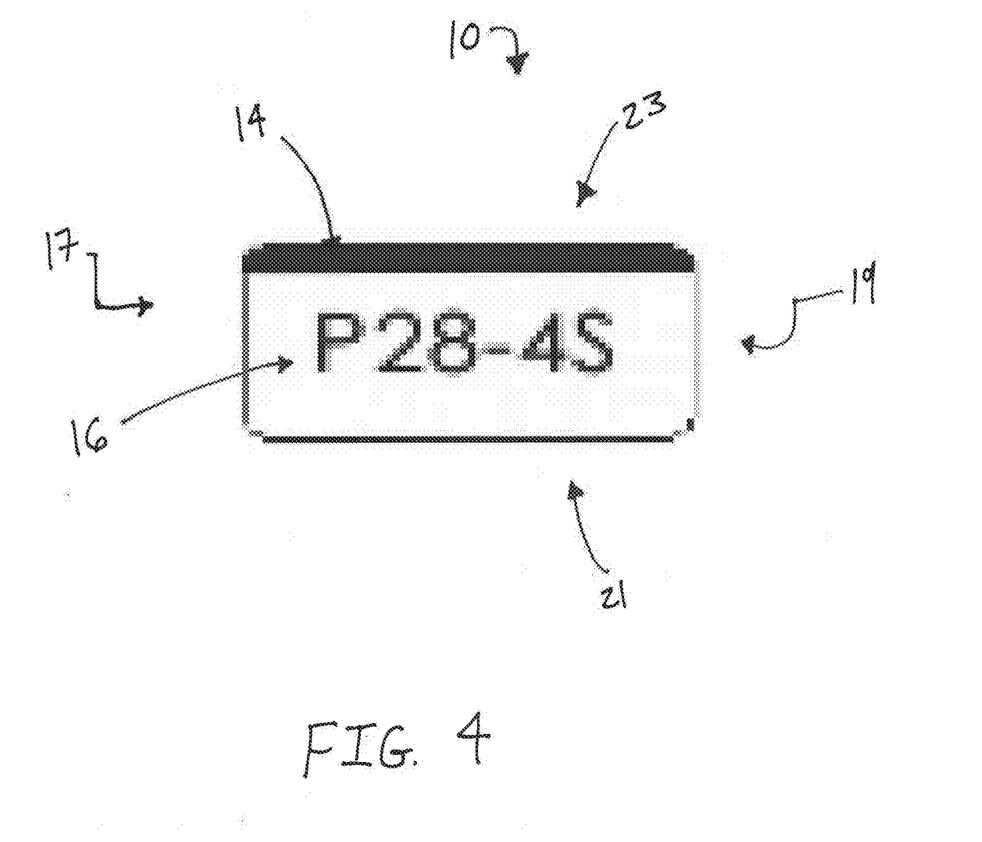
FIG. 4 is a front view of an exemplary label member according to the present disclosure.

Referring now to FIGS. 3-4, a plurality of exemplary label members 10 to 10K of the present disclosure are depicted (e.g., label members 10, 10A, 10B, 10C, 10D, 10E, 10F, 10G, 10H, 10I, 10J, 10K).

Each label member 10 to 10K includes at least one color area 14, and at least one text area 16. In some embodiments, each label member 10 to 10K may not include a text area 16.

In certain embodiments, each label member 10 to 10K can include two or more color areas 14.

Each exemplary label member 10 to 10K takes the form of a rectangular label member 10-10K, although the present disclosure is not limited thereto. Rather, it is noted that each label member 10-10K can take a variety of shapes, forms, sizes, etc. In certain embodiments, each label member 10-10K has a height of about ¼", and has a width of about ½".

Exemplary color area 14 can extend across each label member 10-10K from a first side 17 to a second side 19, although the present disclosure is not limited thereto. Rather, it is noted that each color area 14 can take a variety of shapes, forms, sizes, etc. For example, color area 14 may not extend across from first side 17 to second side 19. In other embodiments, color area 14 extends across each label member 10-10K from a first end 21 to a second end 23.

Exemplary text area 16 can extend across each label member 10-10K from the first side 17 to the second side 19 and be positioned below (or above) the color area 14, although the present disclosure is not limited thereto. Rather, it is noted that each text area 16 can take a variety of shapes, forms, sizes, etc.

In exemplary embodiments, color area 14 is positioned proximal to second end 23, and text area 16 is positioned below color area 14 and extends from color area 14 to first end 21, although the present disclosure is not limited thereto.

In general, each label member 10 to 10K in the array includes one or more color areas or stripes 14 at a margin of each label member 10 to 10K (e.g., proximal to first end 21 and/or proximal to second end 23), so as not to reduce the printable label space of text area 16.

In exemplary embodiments and as shown in FIG. 3, each successive (e.g., laterally successive) label member 10-10K includes a different stripe and/or color in the respective color area 14 for each label member 10-10K, which will cycle through a repeating pattern of colors (e.g., a repeating pattern of the colors defined by industry specification TIA-598), and then repeat in the same sequence.

For example, the color area 14 of label member 10 can include the color blue, which signifies fiber number one for industry specification TIA-598.

The color area 14 of label member 10A can include the color orange, which signifies fiber number two for industry specification TIA-598.

The color area 14 of label member 10B can include the color green, which signifies fiber number three for industry specification TIA-598.

The color area 14 of label member 10C can include the color brown, which signifies fiber number four for industry specification TIA-598.

The color area 14 of label member 10D can include the color slate (grey), which signifies fiber number five for industry specification TIA-598.

The color area 14 of label member 10E can include the color white, which signifies fiber number six for industry specification TIA-598.

The color area 14 of label member 10F can include the color red, which signifies fiber number seven for industry specification TIA-598.

The color area 14 of label member 10G can include the color black, which signifies fiber number eight for industry specification TIA-598.

The color area 14 of label member 10H can include the color yellow, which signifies fiber number nine for industry specification TIA-598.

The color area 14 of label member 10I can include the color violet, which signifies fiber number ten for industry specification TIA-598.

The color area 14 of label member 10J can include the color rose (pink), which signifies fiber number eleven for industry specification TIA-598.

The color area 14 of label member 10K can include the color aqua, which signifies fiber number twelve for industry specification TIA-598.

Each label member 10-10K can be fabricated on sheet/roll 18, and each can include an adhesive backing or the like (e.g., adhesive-backed label members 10-10K). Label members 10-10K can be fabricated in repeated lateral rows that are stacked above one another, as shown in FIG. 3.

As noted, the present disclosure provides improved methods for labeling data center applications, patch field applications and/or media patching systems that utilize panel member 12 or the like.

In exemplary embodiments, by fabricating a pre-printed, repeating pattern of the colors defined by industry specification TIA-598 to a roll/sheet of printable labels, this color coding can be advantageously applied to an array of patch field label members 10-10K. Once the label members 10-10K are printed and applied, the individual and unique color area 14 of each label member 10-10K will translate to a sub-unit fiber number, while the overall array of color areas 14 of the label members 10-10K will reveal the panel member 12 polarity, which is important service information, which will be delivered in an immediate visual color-coded manner to the servicing technicians without the need for additional text.

In exemplary embodiments, by fabricating a pre-printed, repeating pattern of these colors to a roll or sheet 18 of printable label members 10-10K, this color coding can be advantageously applied to an array of patch field labels.

FIG. 1 depicts a twelve label member 10-10K array in an exemplary deployment or labeling scheme of the present disclosure.

As shown in FIG. 1, the label members 10-10K have been applied to a label field that is defined by the front panel surface 15 of panel member 12 (e.g., a high-density rack-mounted panel member 12).

The panel member 12 itself is 1 U high, and contains forty-eight separate apertures 13 for individual connector assemblies (e.g., individual fiber adapter modules).

FIG. 1 shows only the left half of the panel member 12, and one individual label member 10-10K can be applied or mounted in the space above each respective aperture 13.

More specifically, label member 10 can be mounted above its respective aperture 13 as shown in FIG. 1, and the color area 14 of label member 10 (blue) thereby signifies that the connector assembly (e.g., fiber adapter module) mounted to that particular aperture 13 corresponds to fiber number one for industry specification TIA-598.

Label member 10A can be mounted above its respective aperture 13 as shown in FIG. 1, and the color area 14 of label member 10A (orange) thereby signifies that the connector assembly (e.g., fiber adapter module) mounted to that particular aperture 13 corresponds to fiber number two for industry specification TIA-598.

Label member 10B can be mounted above its respective aperture 13 as shown in FIG. 1, and the color area 14 of label member 10B (green) thereby signifies that the connector assembly (e.g., fiber adapter module) mounted to that particular aperture 13 corresponds to fiber number three for industry specification TIA-598.

Label member 10C can be mounted above its respective aperture 13 as shown in FIG. 1, and the color area 14 of label member 10C (brown) thereby signifies that the connector assembly (e.g., fiber adapter module) mounted to that particular aperture 13 corresponds to fiber number four for industry specification TIA-598.

Label member 10D can be mounted above its respective aperture 13 as shown in FIG. 1, and the color area 14 of label member 10D (slate or grey) thereby signifies that the connector assembly (e.g., fiber adapter module) mounted to that particular aperture 13 corresponds to fiber number five for industry specification TIA-598.

Label member 10E can be mounted above its respective aperture 13 as shown in FIG. 1, and the color area 14 of label member 10E (white) thereby signifies that the connector assembly (e.g., fiber adapter module) mounted to that particular aperture 13 corresponds to fiber number six for industry specification TIA-598.

Label member 10F can be mounted above its respective aperture 13 as shown in FIG. 1, and the color area 14 of label member 10F (red) thereby signifies that the connector assembly (e.g., fiber adapter module) mounted to that particular aperture 13 corresponds to fiber number seven for industry specification TIA-598.

Label member 10G can be mounted above its respective aperture 13 as shown in FIG. 1, and the color area 14 of label member 10G (black) thereby signifies that the connector assembly (e.g., fiber adapter module) mounted to that particular aperture 13 corresponds to fiber number eight for industry specification TIA-598.

Label member 10H can be mounted above its respective aperture 13 as shown in FIG. 1, and the color area 14 of label member 10H (yellow) thereby signifies that the connector assembly (e.g., fiber adapter module) mounted to that particular aperture 13 corresponds to fiber number nine for industry specification TIA-598.

Label member 10I can be mounted above its respective aperture 13 as shown in FIG. 1, and the color area 14 of label member 10I (violet) thereby signifies that the connector assembly (e.g., fiber adapter module) mounted to that particular aperture 13 corresponds to fiber number ten for industry specification TIA-598.

Label member 10J can be mounted above its respective aperture 13 as shown in FIG. 1, and the color area 14 of label member 10J (rose or pink) thereby signifies that the connector assembly (e.g., fiber adapter module) mounted to that particular aperture 13 corresponds to fiber number eleven for industry specification TIA-598.

Label member 10K can be mounted above its respective aperture 13 as shown in FIG. 1, and the color area 14 of label member 10K (aqua) thereby signifies that the connector assembly (e.g., fiber adapter module) mounted to that particular aperture 13 corresponds to fiber number twelve for industry specification TIA-598.

If the whole panel member 12 of FIG. 1 were to be labeled using these arrays of label members 10-10K, four full sets of twelve label members 10-10K would be utilized. In this panel member 12 application, there typically is no room for a panel or module silkscreen, so being able to identify port numbers by color makes it much easier to locate specific ports and connections.

Figure 2:
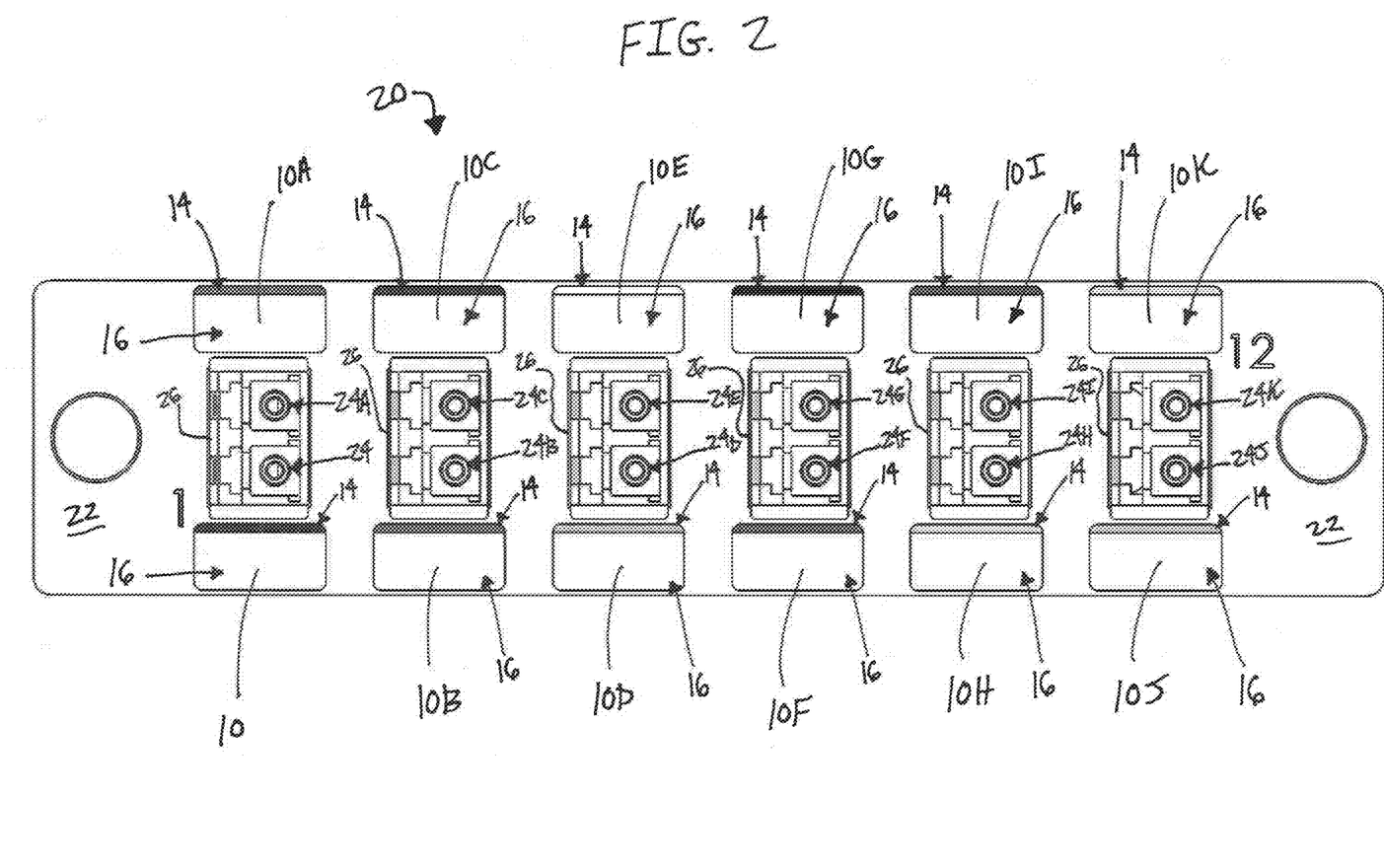
FIG. 2 is a front view of an exemplary labeled connector assembly according to the present disclosure.

FIG. 2 depicts a twelve label member 10-10K array in another exemplary deployment or labeling scheme of the present disclosure.

In FIG. 2, a set of twelve label members 10-10K has been applied or mounted to the front surface 22 of a connector assembly 20 taking the form of a twelve-fiber LC cassette assembly 20, thereby advantageously making the front port 24 numbering immediately obvious. In general, fiber optic cassette assembly includes a plurality of fiber optic ports 24 (e.g., twelve ports 24-24K) for mating with fiber optic connectors.

With exemplary assembly 20, there is typically only room for the numbers "1" and "12" to be silkscreened on the cassette assembly 20, and it is not clear without labeling whether the ports 24 are numbered in two rows of six (fibers one through six for industry specification TIA-598 on the bottom of each duplex adapter 26, and fibers seven through twelve for industry specification TIA-598 across the top of each duplex adapter 26), or numbered in pairs (where port two would be on the same adapter 26 as port "1").

As shown in FIG. 2, the color array immediately reveals that it is the latter, with port 24A for fiber two of industry specification TIA-598 (label member 10A having color area 14 being orange) positioned above port 24 for fiber one of industry specification TIA-598 (label member 10 having color area 14 being blue).

Continuing on and as shown in FIG. 2, port 24B for fiber three (label member 10B having color area 14 being green) is positioned below port 24C for fiber four (label member 10C having color area 14 being brown).

Port 24D for fiber five (label member 10D having color area 14 being slate/grey) is positioned below port 24E for fiber six (label member 10E having color area 14 being white).

Port 24F for fiber seven (label member 10F having color area 14 being red) is positioned below port 24G for fiber eight (label member 10G having color area 14 being black).

Port 24H for fiber nine (label member 10H having color area 14 being yellow) is positioned below port 24I for fiber ten (label member 10I having color area 14 being violet).

Port 24J for fiber eleven (label member 10J having color area 14 being rose/pink) is positioned below port 24K for fiber twelve (label member 10K having color area 14 being aqua).

Again, the individual label members 10-10K provide immediate recognition of the individual port number (e.g., 1-12), while the overall array of label members 10-10K reveals the overarching polarity of cassette assembly 20, which can be equally important to a servicing technician.

FIGS. 1-2 illustrate the kind of clarity and immediate visual recognition which this label member 10-10K array method provides, even without text printed on the label members 10-10K. Text can be added (printed or handwritten) to text area 16 (see, e.g., FIG. 4) to provide further information, and text area 16 can be relieved of the need to have characters devoted to port numbering due to the color of color area 14.

By utilizing color-coding with these disclosed systems/methods, this highly advantageous deployment scheme or labeling method has several advantages, including but not limited to: (i) one row of label members 10 corresponds to one trunk cable sub-unit, and thus one (or half of one in higher density applications) cassette/adapter panel 12, allowing for easy indexing of label member 10 deployment; (ii) each cassette/adapter panel 12 will have its label color field pattern match, greatly reducing the risk of labeling errors and omissions; (iii) text characters corresponding to port numbers can be omitted from text area 16 and instead coded by label color in color area 14, allowing more text space in text area 16 for more detailed port descriptions; and (iv) through differing color sequences, differing panel polarity schemes can be codified without additional text.

Because the technicians involved in this process are used to dealing with TIA-598 color coding sequences in other applications (e.g., cable fiber sub-units and breakout kits), the meaning of these colors will be extremely intuitive for them.

Label colors in color areas 14 will also be more visible and easily discernable than the port numbering on a panel silkscreen. For that reason, these color-coded label members 10 will provide additional advantages during later servicing of the patch field. For example, technicians will associate port numbers with specific label colors (e.g., blue=port #1, yellow=port #9, etc.), greatly increasing the speed with which correct individual ports are identified, and reducing both service time and service errors. Additionally, panel polarity will be immediately evident by the color pattern of the associated label field, again reducing service errors by preventing the application of incompatible cabling.

According to industry specification TIA-598, it is to be noted that for more than twelve fibers, the color codes are repeated and striped with black (except the color black, which is striped with yellow), and every twelve additional fibers adds one stripe. Thus and if needed, for fiber thirteen, a label member 10L could be utilized, the label member 10L having a color area 14 having the color blue with a black stripe. For fibers fourteen and beyond, one could proceed accordingly for new label members 10M and beyond.

Although the systems/methods of the present disclosure have been described with reference to exemplary embodiments thereof, the present disclosure is not limited to such exemplary embodiments. Rather, the systems/methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that matter contained in the drawings and specification be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method for labeling data center applications comprising:
    providing a first plurality of label members, each label member of the first plurality of label members having a color area that includes a unique color coding in the color area that is different than each color coding in the other respective color areas of the other respective label members of the first plurality of label members;
    positioning each label member of the first plurality of label members proximal to an individual and distinct optical fiber port of a media patching system;
    wherein each unique color coding of each label member of the first plurality of label members specifies a unique and distinct fiber unit to be mounted with respect to the optical fiber port respectively positioned proximal to each label member of the first plurality of label members.

2. The method of claim 1 further comprising:
    providing a second plurality of label members, each label member of the second plurality of label members having a color area that includes a unique color coding in the color area that is different than each color coding in the other respective color areas of the other respective label members of the second plurality of label members;

positioning each label member of the second plurality of label members proximal to an individual and distinct optical fiber port of the media patching system;

wherein each unique color coding of each label member of the second plurality of label members specifies a unique and distinct fiber unit to be mounted with respect to the optical fiber port respectively positioned proximal to each label member of the second plurality of label members.

3. The method of claim 1, wherein each label member of the first plurality of label members includes a text area, each text area configured to include text symbols.

4. The method of claim 1, wherein the first plurality of label members includes a first label member, a second label member, a third label member, a fourth label member, a fifth label member and a sixth label member; and wherein the color area of the first label member includes the color blue, the color area of the second label member includes the color orange, the color area of the third label member includes the color green, the color area of the fourth label member includes the color brown, the color area of the fifth label member includes the color slate, and the color area of the sixth label member includes the color white.

5. The method of claim 4, wherein the first plurality of label members includes a seventh label member, an eighth label member, a ninth label member, a tenth label member, an eleventh label member and a twelfth label member; and wherein the color area of the seventh label member includes the color red, the color area of the eighth label member includes the color black, the color area of the ninth label member includes the color yellow, the color area of the tenth label member includes the color violet, the color area of the eleventh label member includes the color rose, and the color area of the twelfth label member includes the color aqua.

6. The method of claim 1, wherein each unique color coding of each label member of the first plurality of label members includes a color from the TIA-598 specification.

7. The method of claim 1, wherein the media patching system includes a panel member; and wherein each label member of the first plurality of label members is positioned on a front surface of the panel member.

8. The method of claim 1, wherein the media patching system includes a cassette assembly; and wherein each label member of the first plurality of label members is positioned on a front surface of the cassette assembly.

9. The method of claim 1, wherein the media patching system includes a panel member, the panel member including a plurality of apertures; and wherein the panel member is a patch panel member.

10. The method of claim 1, wherein each individual and distinct optical fiber port of the media patching system is configured for mating with fiber optic connectors.

11. The method of claim 1, wherein the media patching system is configured to be mounted with respect to a supporting structure.

12. The method of claim 11, wherein the supporting structure is a network or server rack.

13. The method of claim 1, wherein the first plurality of label members are provided on a sheet or roll.

14. The method of claim 1, wherein each label member of the first plurality of label members includes an adhesive backing.

15. A method for labeling data center applications comprising:

providing a first plurality of label members, each label member of the first plurality of label members having a color area that includes a unique color coding in the color area that is different than each color coding in the other respective color areas of the other respective label members of the first plurality of label members;

positioning each label member of the first plurality of label members proximal to an individual and distinct optical fiber port of a media patching system;

wherein each label member of the first plurality of label members includes a text area, each text area configured to include text symbols;

wherein each individual and distinct optical fiber port of the media patching system is configured for mating with fiber optic connectors;

wherein the media patching system is configured to be mounted with respect to a supporting structure;

wherein each unique color coding of each label member of the first plurality of label members specifies a unique and distinct fiber unit to be mounted with respect to the optical fiber port respectively positioned proximal to each label member of the first plurality of label members;

wherein the first plurality of label members includes a first label member, a second label member, a third label member, a fourth label member, a fifth label member and a sixth label member; and wherein the color area of the first label member includes the color blue, the color area of the second label member includes the color orange, the color area of the third label member includes the color green, the color area of the fourth label member includes the color brown, the color area of the fifth label member includes the color slate, and the color area of the sixth label member includes the color white.

16. The method of claim 15, further comprising:

providing a second plurality of label members, each label member of the second plurality of label members having a color area that includes a unique color coding in the color area that is different than each color coding in the other respective color areas of the other respective label members of the second plurality of label members;

positioning each label member of the second plurality of label members proximal to an individual and distinct optical fiber port of the media patching system;

wherein each label member of the second plurality of label members includes a text area, each text area configured to include text symbols;

wherein each unique color coding of each label member of the second plurality of label members specifies a unique and distinct fiber unit to be mounted with respect to the optical fiber port respectively positioned proximal to each label member of the second plurality of label members.

17. The method of claim 15, wherein the first plurality of label members includes a seventh label member, an eighth label member, a ninth label member, a tenth label member, an eleventh label member and a twelfth label member; and wherein the color area of the seventh label member includes the color red, the color area of the eighth label member includes the color black, the color area of the ninth label member includes the color yellow, the color area of the tenth label member includes the color violet, the color area of the eleventh label member includes the color rose, and the color area of the twelfth label member includes the color aqua.

18. The method of claim 15, wherein the media patching system includes a panel member, the panel member including a plurality of apertures; and wherein the panel member is a patch panel member.

\* \* \* \* \*